United States Patent [19]

Stansfield

[11] 3,938,083

[45] Feb. 10, 1976

[54] PARITY CHECKING A DOUBLE-FREQUENCY COHERENT-PHASE DATA SIGNAL

[75] Inventor: Garry A. G. Stansfield, Mitcham, England

[73] Assignee: Burroughs Corporation, Detroit, Mich.

[22] Filed: Nov. 27, 1974

[21] Appl. No.: 527,899

[52] U.S. Cl..................................... 340/146.1 AG
[51] Int. Cl.².......................................... G06F 11/10
[58] Field of Search............ 340/146.1 AG, 146.1 F; 360/43

[56] References Cited
UNITED STATES PATENTS

| | | | |
|---|---|---|---|
| 3,436,730 | 4/1969 | Widel........................ | 340/146.1 AG |
| 3,524,164 | 8/1970 | Cox et al.................... | 340/146.1 AG |
| 3,685,015 | 8/1972 | Bocek....................... | 340/146.1 AG |
| 3,763,470 | 10/1973 | Geng et al.................. | 340/146.1 AG |

Primary Examiner—Charles E. Atkinson
Attorney, Agent, or Firm—Benjamin J. Barish; Karl Stoess; William B. Penn

[57] ABSTRACT

Method and apparatus are described for storing and retrieving data in the form of double-frequency coherent-phase signals having a plurality of "$n$" data bits, and particularly for making a parity check of such data. To make the parity check, the level of the signal is sampled at a first point between the beginning and middle of the first data bit, and at a second point between the middle and the end of the "$n$"th data bit. The levels of the two samples are compared, and a parity bit is generated of a level determined by whether "$n$" is an odd or even number, and whether there is to be odd or even parity. Described is a parity generating means in the form of an EXCLUSIVE-OR logical network to provide odd parity when "$n$" is an even number, or to provide even parity when "$n$" is an odd number. Also described is an equivalent logical network which can be used for effecting an even parity check when "$n$" is an even number, or an odd parity check when "$n$" is an odd number.

10 Claims, 3 Drawing Figures

PARITY CHECKING A DOUBLE-FREQUENCY COHERENT-PHASE DATA SIGNAL

BACKGROUND OF THE INVENTION

The present invention relates to methods and systems for storing and retrieving data, particularly data in the form of double-frequency coherent-phase signals, and especially concerns the technique of making a parity check of such data signals.

The double-frequency coherent-phase code is one technique for storing and retrieving information with respect to a data storage device, such as a magnetic record medium. In such a code, each binary bit experiences a change in level or polarity at the beginning and end of the bit. The double-frequency code involves the use of two frequencies, a unit frequency providing one complete cycle of flux change within a bit, and a double-unit frequency providing one-half cycle of flux change within a bit. Thus, the binary "1" may be represented on a magnetic record medium by a change in magnetization from a negative sense to a positive sense, or vice versa, at the centre of the bit; and the binary "0" would be represented by the absence of a change in magnetization at the centre of the bit.

Accordingly, when a binary digit is read from the storage device in a system based on such a code, a critical portion of the read signal is examined and within a precise time interval, or "sampling window", near the centre of the bit or cell, to determine the presence or absence of a polarity or level transition.

A parity check is a technique commonly used to determine whether the data retrieved or read-out of a storage device is exactly the same data originally stored or read-into the device. This method of checking for parity is executed by adding a parity bit to the data signal, the latter being in the form of a word having a plurality of data bits. In the case of an even parity check, if the data signal being stored has an even number of binary 1's, a "0" is recorded as the parity bit; and if the data signal has an odd number of binary 1's, a "1" is recorded as the parity bit. In the case of an odd parity check, the parity bit added would be the appropriate one to provide an odd number of binary 1's to the data word. Each time a data signal having a plurality of data bits is retrieved from the storage device, the number of 1's is sensed and compared with the parity bit. If they are alike, the data processing system continues to operate, but if they are unalike, an error signal is produced to indicate this error.

SUMMARY OF THE PRESENT INVENTION

The present invention provides a simplified method and system for generating a parity bit for parity checking a double-frequency coherent-phase data signal. The present invention also provides a method and system for storing and retrieving information in a reliable manner by using the simplified parity check.

According to one aspect of the present invention, therefore, there is provided a method of generating a parity bit for parity checking a double-frequency coherent-phase data signal having a plurality of "n" data bits, comprising the steps of: sampling the level of the signal at a first point between the beginning and middle of the first data bit; sampling the level of the signal at a second point between the middle and the end of the nth data bit; comparing the levels at said two sampled points; and generating in response to said comparison a parity bit of a level as predetermined by whether "$n$" is an odd or even number and whether there is to be odd or even parity.

According to a more specific aspect, the method of checking parity as set forth above is one wherein a parity bit of a "1" level is generated when "n" is an even number and one sampled level but not both are a "1", or when "$n$" is an odd number and neither or both sampled levels are a "1"; and wherein a parity bit of a "0" level is generated when "$n$" is an even number and one sampled level but not both are a "1", or when "$n$" is an odd number and neither or both sampled levels are a "1".

According to another aspect of the invention, there is provided a system for generating a parity bit for parity checking a double-frequency coherent-phase data signal having a plurality of "$n$" data bits comprising: first sampling means sampling the level of the signal at a point between the beginning and middle of the first data bit; second sampling means sampling the level of the signal at a point between the middle and the end of the nth data bit; and means generating from both said samples a parity bit of a level as predetermined by whether there is to be odd or even parity.

Such a system may take several different forms. In one form, "$n$" is an even number and the parity generating means comprises an EXCLUSIVE-OR logical network providing odd parity. In a second form "$n$" is an odd number, and the parity generating means comprises an EXCLUSIVE-OR logical network providing even parity.

In a further arrangement, "$n$" is an even number and the parity generating means comprises an EQUIVALENT (i.e. an inverted EXCLUSIVE-OR) logical network providing even parity; and in a still further arrangement, "$n$" is an odd number and the parity generating means comprises an EQUIVALENT logical network providing odd parity.

It will thus be seen that with the method and system of the present invention, a parity check can easily be made by merely sampling portions of the first and last data bits, without sensing the complete word or other information from the data bits inbetween the first and last ones. The parity check can thus be implemented with simpler and less expensive circuitry.

Further features and advantages of the invention will be apparent from the description below.

BRIEF DESCRIPTION OF THE DRAWINGS

To better aid in understanding the present invention, it is described below with reference to two preferred embodiments thereof illustrated in the accompanying drawings wherein.

DESCRIPTION OF THE PREFERRED EMBODIMENTS

Figure 1:
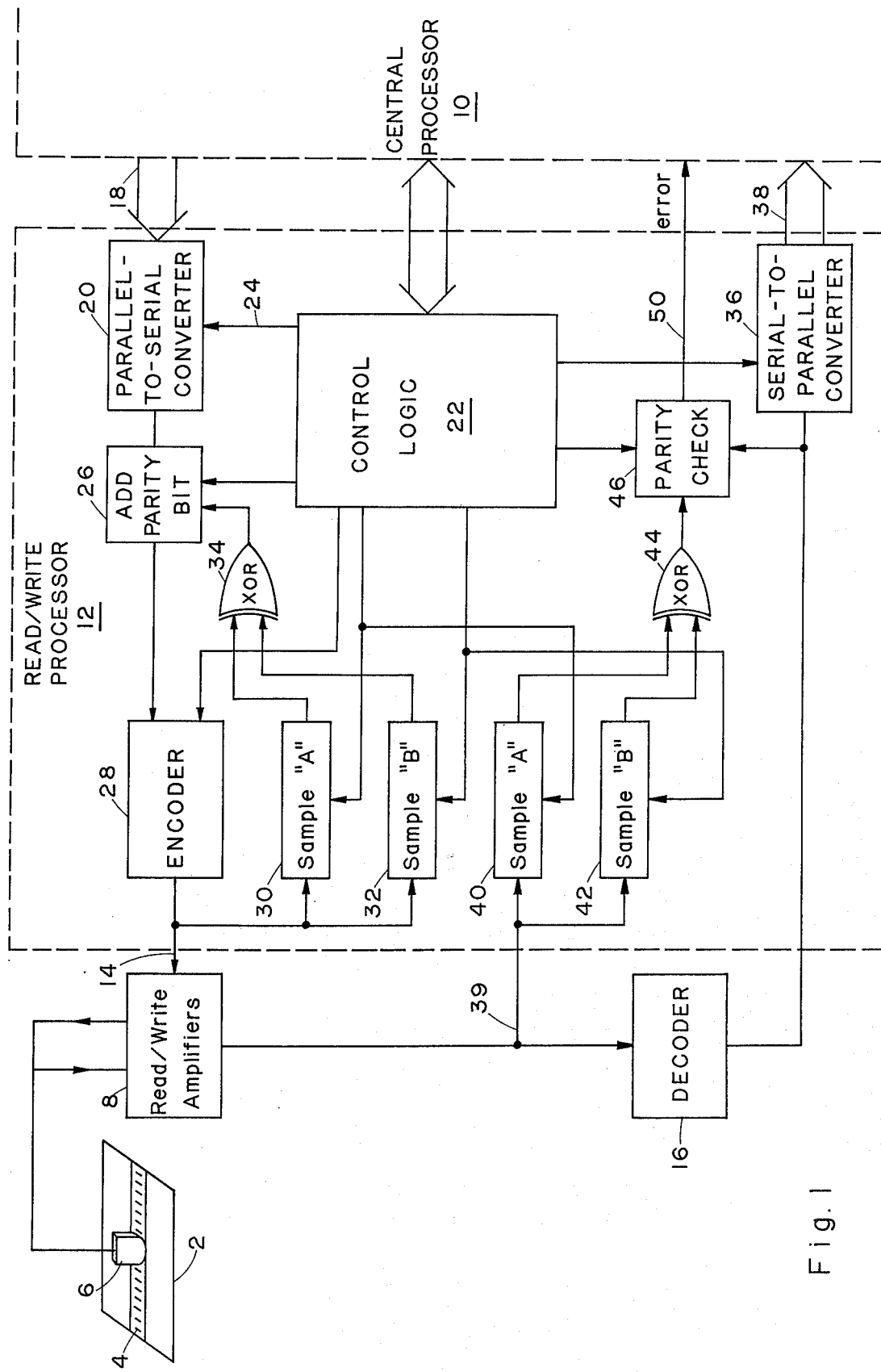
FIG. 1 illustrates one system constructed in accordance with the invention for recording and reproducing data with respect to a machine-readable card.

The preferred embodiment of the invention illustrated in the drawings is a system for recording and reproducing data with respect to a machine-readable record medium. In this case, the record medium is a magnetically-encoded credit card in which the data is recorded in the form of magnetic stripes on a predetermined location on the card. Such devices are used in automatic currency dispensers, for example, wherein the user inserts into the machine his personalized credit card having identifying and other data magnetically recorded thereon, the card controlling the apparatus to dispense a predetermined amount of currency to the user and also to record this information on his card. Such systems are known and in commercial use, and therefore further particulars are not deemed necessary.

The present invention is concerned primarily with making a parity check with respect to the data recorded on the user's card and the data reproduced from the user's card, to minimize the possibility of error between the two.

In FIG. 1, the user's credit card is generally designated 2 and includes a stripe 4 of magnetizable material on which data is magnetically encoded by means of a magnetic recording and reproducing head 6. Read and write amplifiers, generally designated by box 8, feed the data to and from the magnetic head 6. The data fed to the head is supplied from a Central Processor 10 via a Read/Write Processor 12 and input line 14. The data read-out of the magnetic card 2 via head 6 is fed via a decoder 16 and the Read/Write Processor 12 to the Central Processor 10.

The Central Processor 10 and the Read/Write Processor 12 may both be well known and commercially available units, and therefore only those portions involved in the present invention are described below.

The data to be written on card 2 supplied from Central Processor 10 is in the form of 4-bit parallel hexadecimal digits in the application described. It is fed via line 18 to a parallel-to-serial converter 20 of the Read/Write Processor 12. A Control Logic Unit 22 in Processor 12 time-shares, via line 24, the feeding of this data to the card 2.

The four bits of data exit from converter 20 in serial form, and after having the parity bit added in unit 26 as to be described below, are fed in binary form to an encoder 28. The latter encoder converts the signal to a double-frequency coherent-phase (F-2-F) signal which is fed via line 14 and amplifier 8 to magnetic head 6 for encoding on the card.

The double-frequency current-phase signal outputted from encoder 28 is also fed to two sampling circuits, 30 and 32. Sample circuit 30 samples and stores the level of the signal at a point between the beginning and middle of the first data bit, preferably just after the beginning of the first data bit. Sample circuit 32 samples the level of the signal at a point between the middle and the end of the last (fourth) data bit, preferably just after the middle of that bit, or of approximately 70% of the bit time. The two samples are then fed to an EXCLUSIVE-OR logical network 34, the output of which network constitutes the parity bit fed to unit 26 which adds same to the initial data signal.

Figure 2:
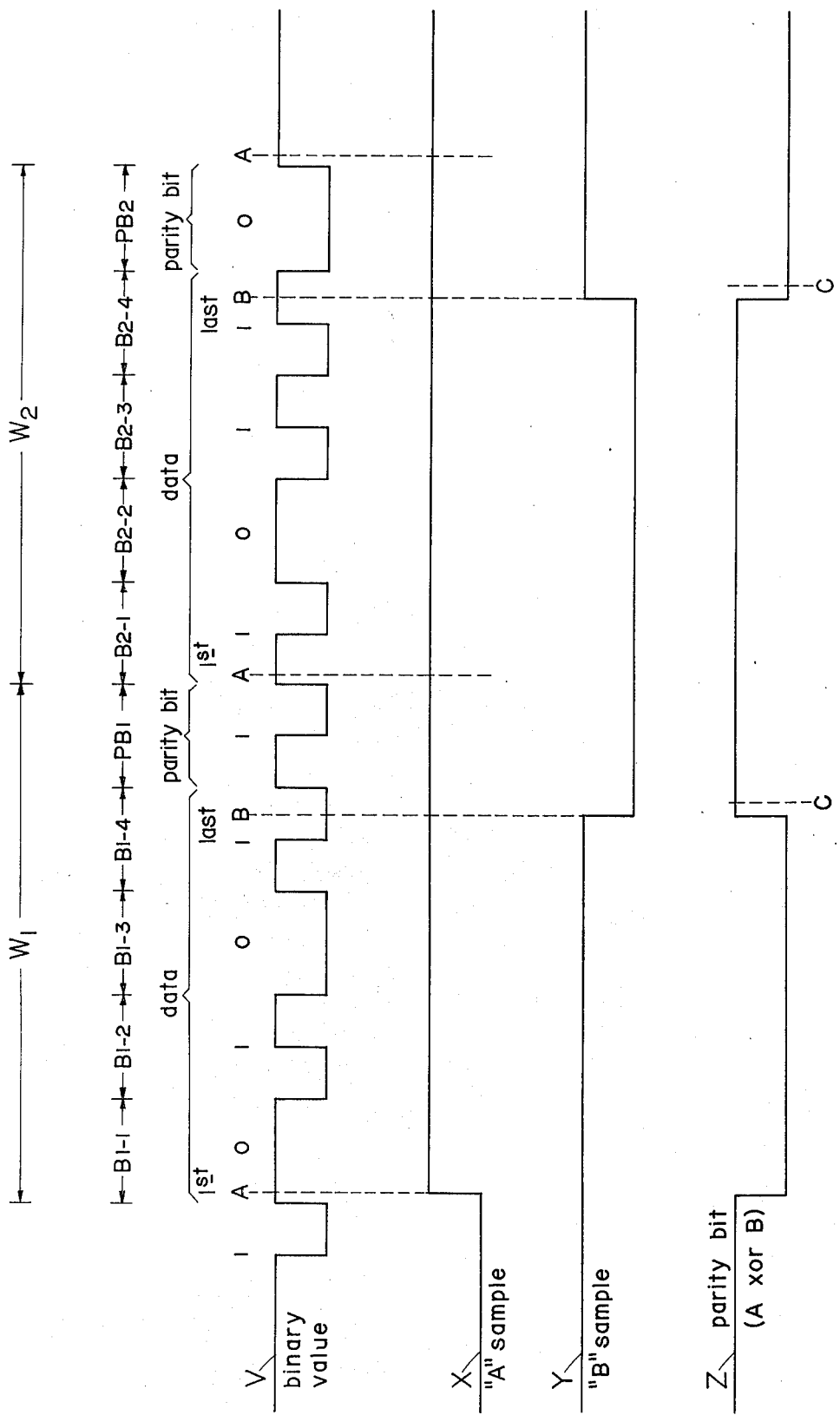
FIG. 2 illustrates a series of timing signal wave-forms involved in the system of FIG. 1.

FIG. 2 illustrates the wave-forms in the described example involving an even number (4) data bits and odd parity. In the example illustrated in FIG. 2, there are two data signals or words, W1, W2. Word W1 includes four data bits, B1-1 to B1-4 and a parity bit PB1; and word W2 includes four data bits B2-1 to B2-4 and a parity bit PB2.

Also in FIG. 2, wave-form V represents the binary value of the data and parity bit signals; wave-form X represents the signal at sampling point A effected by sample circuit 30; wave-form Y represents the signal at sampling point B effected by sample circuit 32; and wave-form Z represents the signal output from EXCLUSIVE-OR logic network 34 which is the parity bit added to the data signal in unit 26.

As shown in FIG. 2, the four bits of signal W1 are, respectively, 0, 1, 0 and 1, it being appreciated that the code is a double-frequency coherent-phase one in which a "0" is represented by no level or polarity change within the bit, and a "1" is represented by there being a level or polarity change within the bit. Thus, sample circuit 30 samples the first signal W1 at the beginning (point A) of the first bit B1-1, and since that signal (V) is high at that point, the sampled signal will also be high as shown by signal X at point A. Sample circuit 32 samples the first signal W1 shortly after the middle of the last bit, at point B, and since the signal is low at that point, the sampled level will also be low, as shown by signal Y at point B.

The EXCLUSIVE-OR circuit 34 thus receives, at one input, the high level signal X, and at the second input the low level signal Y, and therefore the output of the EXCLUSIVE-OR network 34 (at point C, which is shortly after point B) is high. This high level signal, representing a "1", is the parity bit added to the data signal by unit 26.

With respect to the second data signal W2 illustrated in FIG. 2, it will be seen that its four bits are, respectively, 1, 0, 1, 1. Accordingly, when sampling circuit 30 samples the signal at the beginning of its first bit (point A), the output of the sampling circuit will be a "1" as represented by signal X in FIG. 2; and when sampling circuit 32 samples the signal just after the middle of its fourth bit (point B), the output of the sample circuit will also be a "1" as represented by signal Y in FIG. 2.

With respect to the second data word W2, therefore, the EXCLUSIVE-OR circuit 34 receives two 1's as its input; accordingly, it produces a "0" output as represented by signal Z at point C immediately following point B. The parity bit generated for signal W2 will thus be a "0", this parity bit being added to the data signal by unit 26.

The timing and control of sampling units 30 and 32 is effected by the Control Logic Unit 22 in the Read/Write Processor 12 in any well-known manner. This Control Logic Unit also controls other units of the system, including encoder 28, the parity bit adder unit 26, and the parallel-to-serial converter 28 as shown by the line connections to these units.

The information recorded on the magnetic card 2 will therefore include not only the double-frequency coherent-phase data signals (4 bits), but also the parity bit generated in the manner described above.

A parity check is made on the information read-out of the card via magnetic head 6 in the following manner.

The information from head 6 is fed via amplifier 8 to decoder 16, wherein the encoded signal is decoded into binary form, and is then fed to Central Processor 10 via serial-to-parallel converter 36 and its output line 38. The signal outputted from amplifier 8 is also fed via line 39 to two additional sampling circuits, 40 and 42, corresponding to sampling circuits 30 and 32 of the read-in system.

Sampling circuit 40 performs the same function with respect to the read-out signal supplied from line 39 as sampling circuit 30 performs with respect to the read-in signal supplied from line 14; namely, it samples the level of the signal at point A of FIG. 2, shortly after the beginning of the first bit, producing the sample signal X of FIG. 2. Similarly, sampling circuit 42 performs the same function with respect to the read-out signal as sample circuit 32 performs with respect to the read-in signal; namely it samples the level of the signal at point B of FIG. 2, shortly after the middle of the last (fourth) bit, producing the sample signal Y of FIG. 2.

The output of the two sample circuits 40, 42, are fed to EXCLUSIVE-OR network 44. The output (signal Z of FIG. 2) of the latter network is the parity bit. The so-produced parity-bit is fed to parity check circuit 46, and a parity check is made between the parity bit from the EXCLUSIVE-OR circuit 44 and the parity bit from the read-out signal fed thereto via decoder 16 and line 48.

If the two parity bits do not match, parity check circuit 46 produces an error signal on its output line 50, which signal is supplied to Central Processor 10.

The circuit of FIG. 1 utilizing the EXCLUSIVE-OR logical networks 34 and 44 thus performs an odd parity check with respect to a double-frequency coherent-phase data signal having an even number of data bits. In the example described, the number ("$n$") is four, but it will be appreciated that the same circuit could be used with any other even number.

In addition, the same circuit utilizing the EXCLUSIVE-OR networks, 34, 44, could also be used to perform an even parity check with respect to a double-frequency coherent-phase data signal having an odd number of data bits.

With a slight modification, by changing the EXCLUSIVE-OR logical networks 34, 44, to their inverted counterparts, or EQUIVALENT logical networks, the same circuit can also be used for effecting an even parity check with respect to a data signal having an even number of data bits, or to perform an odd parity check with respect to a data signal having an odd number of data bits.

Figure 3:
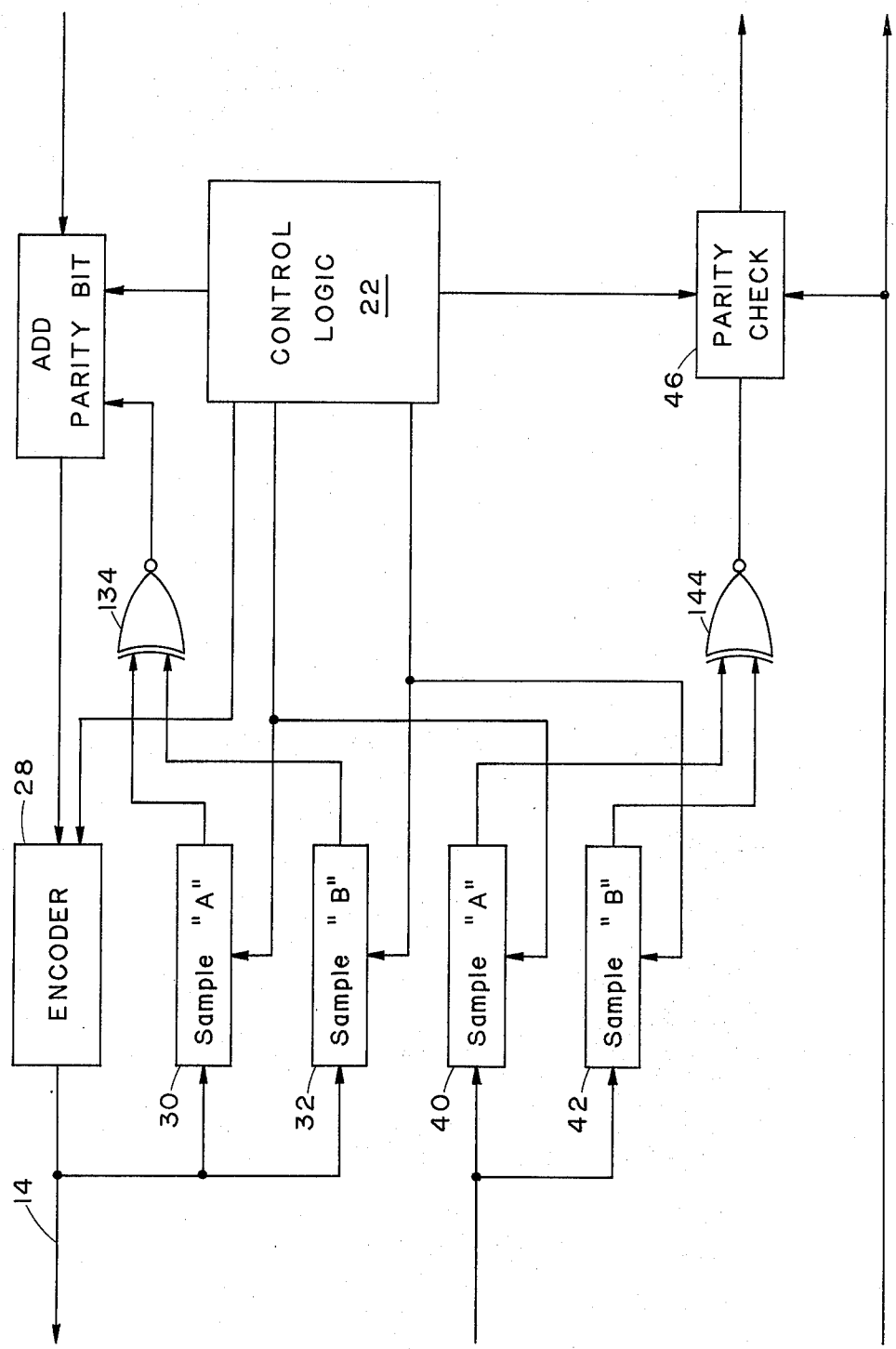
FIG. 3 illustrates a modification of the system of FIG. 1.

The latter modification is exemplified by FIG. 3 illustrating the same circuit as FIG. 2(similar parts being identified with the same reference numerals as in FIG. 2), except that instead of using EXCLUSIVE-OR logical networks 34, 44, for the outputs of the sampling circuit 30, 32, 40, 42, there are used EQUIVALENT logical networks 134, 144, the output of which are inversions of the output of the corresponding circuits 34, 44 in FIG. 1. These outputs are also supplied to the Add Parity Bit and Parity Check circuits, corresponding to circuits 26 and 46, respectively, for making the parity check.

Many other modifications, variations, and applications of the illustrated embodiment will be apparent.

What is claimed is:

1. The method of generating a parity bit for parity checking a double-frequency coherent-phase data signal having a plurality of "$n$" data bits, wherein whether "$n$" is an odd or even number and whether there is to be an odd or even parity check have both been predetermined beforehand, the method comprising the steps of:
    sampling the level of the signal at a first point between the beginning and middle of the first data bit;
    sampling the level of the signal at a second point between the middle and the end of the "$n$"th data bit;
    comparing the levels at said two sampled points;
    and generating in response to said comparison a parity bit of a level as predetermined by whether "$n$" is an odd or even number and whether there is to be odd or even parity.

2. The method according to claim 1, wherein a parity bit of a "1" level is generated when "$n$" is an even number and one sampled level but not both are a "1", or when "$n$" is an odd number and neither or both sampled levels are a "1"; and wherein a parity bit of a "0" level is generated when "$n$" is an even number and one sampled level but not both are a "1", or when "$n$" is an odd number and neither or both sampled levels are a "1".

3. The method of recording from an input device and reproducing therefrom a double-frequency coherent-phase data signal having a plurality of "$n$" data bits and parity checking the recorded and reproduced signals, comprising:
    generating from the signal of the input device a parity bit in accordance with claim 1;
    recording on a record medium the data signal with said generated parity bit;
    reading from the record medium said data signal with said parity bit;
    generating from said read data signal a parity bit in accordance with claim 1; and
    making a parity check of the latter-generated parity bit with the parity bit read from the record medium.

4. A system for generating a parity bit for parity checking a double-frequency coherent-phase data signal having a plurality of "$n$" data bits, wherein whether "$n$" is an odd or even number and whether there is to be an odd or even parity check have both been predetermined beforehand, the system comprising:
    first sampling means sampling the level of the signal at a point between the beginning and middle of the first data bit;
    second sampling means sampling the level of the signal at a point between the middle and the end of the "$n$"th data bit;
    and means generating from both said samples a parity bit of a level as predetermined by whether "$n$" is an odd or even number, and whether there is to be odd or even parity.

5. The system according to claim 4, wherein "$n$" is an even number, and said parity generating means comprises an EXCLUSIVE-OR logical network providing odd parity.

6. The system according to claim 4, wherein "$n$" is an odd number, and said parity generating means comprises an EXCLUSIVE-OR logical network providing even parity.

7. The system according to claim 4, wherein "$n$" is an even number, and said parity generating means comprises an EQUIVALENT logical network providing even parity.

8. The system according to claim 4, wherein "$n$" is an odd number, and said parity generating means comprises an EQUIVALENT logical network providing odd parity.

9. A system of recording on a record medium from an input device and reproducing therefrom a double-frequency coherent-phase data signal, comprising:
    means in accordance with claim 4 for generating a parity bit;
    means for recording on the record medium the data signal with said generated parity bit;
    means for reading from said record medium said data signal with said parity bit;

means for generating from said read data signal another parity bit in accordance with claim 4; and means for making a parity check of the latter-generated parity bit with the parity bit read from the record medium.

10. The system according to claim 4, wherein said record medium is an machine-readable card containing magnetizable material on which said data signal and parity bit are to be recorded.

* * * * *